(12) United States Patent  (10) Patent No.: US 8,688,656 B2
Kashioka  (45) Date of Patent: Apr. 1, 2014

(54) DOCUMENT MANAGEMENT METHOD, DOCUMENT MANAGEMENT APPARATUS, AND DOCUMENT MANAGEMENT SYSTEM

(75) Inventor: Atsushi Kashioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 12/362,297

(22) Filed: Jan. 29, 2009

(65) Prior Publication Data
US 2009/0198680 A1 Aug. 6, 2009

(30) Foreign Application Priority Data

Feb. 6, 2008 (JP) .................................. 2008-026902

(51) Int. Cl.
*G06F 7/06* (2006.01)

(52) U.S. Cl.
USPC ............ 707/694; 707/727; 707/728; 707/748

(58) Field of Classification Search
None
See application file for complete search history.

(56) References Cited

U.S. PATENT DOCUMENTS

| 6,009,442 | A  | * | 12/1999 | Chen et al. ..................... 715/205 |
| 6,621,589 | B1 | * | 9/2003 | Al-Kazily et al. ........... 358/1.15 |
| 6,697,821 | B2 | * | 2/2004 | Ziff et al. ........................ 707/706 |
| 7,752,187 | B2 |   | 7/2010 | Horikiri et al. |
| 2002/0046224 | A1 | * | 4/2002 | Bendik ........................ 707/522 |
| 2002/0116291 | A1 | * | 8/2002 | Grasso et al. .................... 705/27 |
| 2002/0120858 | A1 | * | 8/2002 | Porter et al. ................... 713/200 |
| 2003/0217034 | A1 | * | 11/2003 | Shutt ................................ 707/1 |
| 2004/0015566 | A1 | * | 1/2004 | Anderson et al. ............. 709/219 |
| 2004/0078386 | A1 | * | 4/2004 | Moon et al. .................... 707/102 |

(Continued)

FOREIGN PATENT DOCUMENTS

| CN | 1855981 A | 11/2006 |
| EP | 1338967 A2 | * 8/2003 ................ G06F 9/46 |

(Continued)

OTHER PUBLICATIONS

Office Action for Counterpart Japanese Application No. 2008-026902 dated Nov. 22, 2012.

*Primary Examiner* — Daniel Kinsaul
(74) *Attorney, Agent, or Firm* — Carter, DeLuca, Farrell & Schmidt LLP

(57) ABSTRACT

User characteristic information acquired from the login information of a user is stored as attribute information associated with the document information of a registered document. In accordance with login of the user, a document associated with the acquired user characteristic information is acquired based on the acquired user characteristic information and the stored user characteristic information. A display content to display pieces of information for identifying the acquired document is created. As the attribute information of the document, a weight representing the relevance between the document and each of a plurality of items included in the user characteristic information is stored in association with each other. A display content to classify, based on the weight of each item, the pieces of information for identifying the acquired document and display the information is created.

10 Claims, 16 Drawing Sheets

(56) References Cited

U.S. PATENT DOCUMENTS

| | | | |
|---|---|---|---|
| 2004/0186762 A1* | 9/2004 | Beaven et al. | 705/8 |
| 2004/0205448 A1* | 10/2004 | Grefenstette et al. | 715/500 |
| 2004/0230598 A1* | 11/2004 | Robertson et al. | 707/102 |
| 2005/0097441 A1* | 5/2005 | Herbach et al. | 715/501.1 |
| 2005/0132228 A1* | 6/2005 | Ende | 713/201 |
| 2005/0138540 A1* | 6/2005 | Baltus et al. | 715/511 |
| 2005/0192957 A1* | 9/2005 | Newbold | 707/5 |
| 2006/0190489 A1* | 8/2006 | Vohariwatt et al. | 707/104.1 |
| 2006/0259490 A1* | 11/2006 | Horikiri et al. | 707/9 |
| 2008/0147790 A1* | 6/2008 | Malaney et al. | 709/203 |
| 2008/0201159 A1* | 8/2008 | Gabrick et al. | 705/1 |
| 2009/0049053 A1* | 2/2009 | Barker et al. | 707/10 |

FOREIGN PATENT DOCUMENTS

| | | |
|---|---|---|
| JP | 2000-067067 A | 3/2000 |
| JP | 2003-173343 A | 6/2003 |
| JP | 2003-256452 A | 9/2003 |
| JP | 2004-013213 A | 1/2004 |
| JP | 2006-268700 A | 10/2006 |
| JP | 2007-172281 A | 7/2007 |

* cited by examiner

F I G. 2
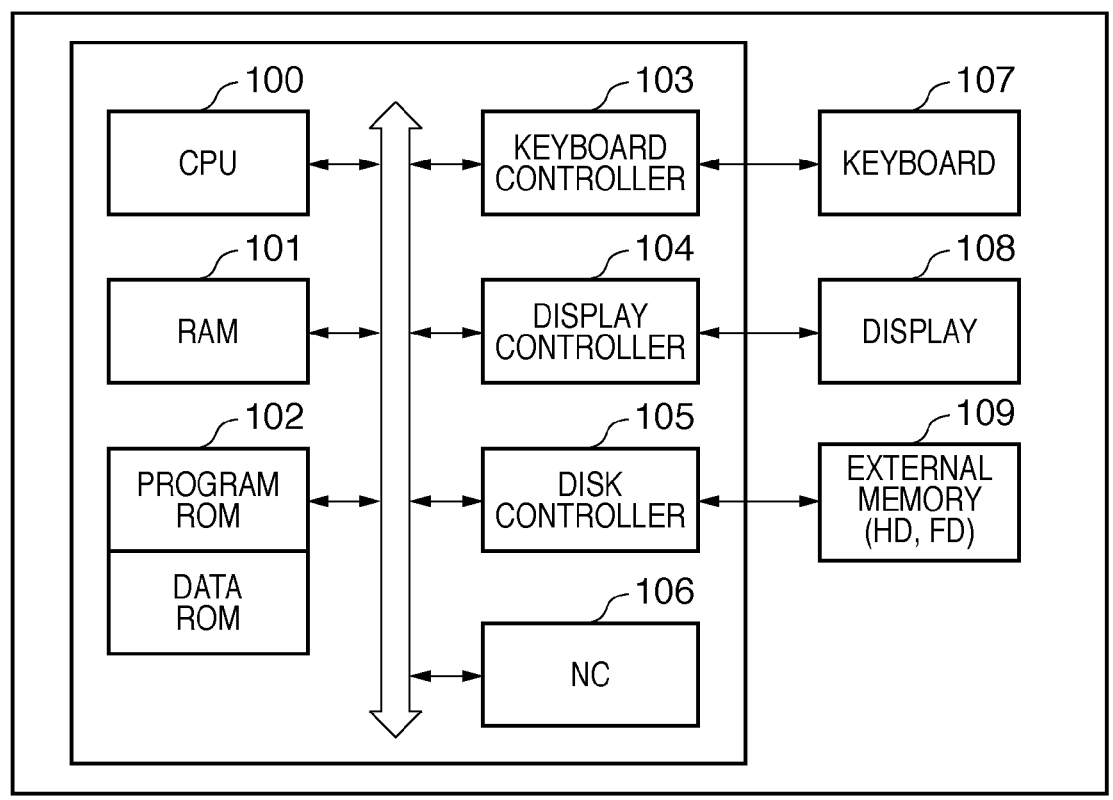

FIG. 6

| NAME | BELONGING SECTION | POST | PART IN SECTION | PROJECT | WORK | ... |
|---|---|---|---|---|---|---|
| AMI TAKAZAWA | DESIGN 1 | CHIEF | APPROVAL | DOCUMENT MANAGEMENT | CHARGE OF NEW OS | ... |
| KAZUO HARAGUCHI | DESIGN 1 | MERE STAFF | FIXED ASSETS MANAGEMENT | DOCUMENT MANAGEMENT | INSTALLER | ... |
| TOSHIKI YOKOO | PLANNING 1 | MERE STAFF | DRINKING PARTY | DOCUMENT MANAGEMENT | REQUIREMENT DEFINITION | ... |
| TERUMI TACHI | DESIGN 2 | SECTION CHIEF | – | Printer Driver | PROJECT MANAGEMENT | ... |
| SHIN KODA | DESIGN 3 | MERE STAFF | PURCHASE | Scanner Driver | INSTALLER | ... |

DOCUMENT MANAGEMENT METHOD, DOCUMENT MANAGEMENT APPARATUS, AND DOCUMENT MANAGEMENT SYSTEM

BACKGROUND OF THE INVENTION

1. Field of the Invention

The present invention relates to a document management method, document management apparatus, and document management system for managing documents. For example, the present invention relates to a document management method, document management apparatus, and document management system which store documents associated with the characteristics or profile of a user, thereby automatically collecting the documents associated with the characteristics or profile of the user who uses the documents later.

2. Description of the Related Art

In many of current document management systems, documents are stored in folders having a hierarchical structure, or documents appear to be stored in folders having a hierarchical structure. A user who manages documents using this arrangement increases the relevance of documents about a specific work by, e.g., storing the associated documents in a single folder or assigning the same index or keyword for the documents.

However, the above-described use of general users does not necessarily match the folder configuration intended by the administrator (the administrator wants to classify documents by format or title) and sometimes brings about a sorting operation or managing operation cumbersome for the administrator.

As a prior art to solve this problem, Japanese Patent Laid-Open No. 2006-268700 has made the following proposal. A concept "workspace" is prepared to allow a general user to use a unique classifying method independently of the folder configuration classified and managed by the administrator. The general user collects specific documents in the workspace to facilitate later use of them.

As another prior art to solve the problem, Japanese Patent Laid-Open No. 2003-173343 has provided a virtual folder-type view (called "user setting tray") which displays a result of retrieval based on arbitrary retrieval conditions designated by a user.

An object of the document management system is to "reuse stored documents or information". Not only one user but also other users who are concerned in the same work or belong to the same organization will use the documents or information.

In the management method of Japanese Patent Laid-Open No. 2006-268700, however, how to make other users use a workspace created by a user is not mentioned. Hence, any user who does not know the presence of a workspace created by another user must ultimately retrieve documents from the conventional hierarchical folder structure.

In the management method of Japanese Patent Laid-Open No. 2003-173343, the user designates a keyword for retrieval. The user can designate a keyword for actual document retrieval to obtain a desired result if the information is uniquely managed by him/her. However, this method is not always effective for collecting documents created by other users.

SUMMARY OF THE INVENTION

The present invention has been made to solve the above problems, and has as its object to provide a document management method, document management apparatus, and document management system for retrieving and collecting information associated with a user using the characteristics of the user. It is another object of the present invention to provide a document management method, document management apparatus, and document management system for performing conventionally cumbersome classification such as folder sorting.

In order to solve the above problems, a document management apparatus, according to the present invention, comprising:

a user characteristic information acquiring unit adapted to acquire user characteristic information for identifying a user from login information of the user;

a document information acquiring unit adapted to acquire document information of a document;

a storage unit adapted to store the user characteristic information acquired by the user characteristic information acquiring unit as attribute information of the document associated with the document information acquired by the document information acquiring unit;

a document acquiring unit adapted to acquire, via the user characteristic information acquiring unit, the user characteristic information of the login user in accordance with login of the user, and to acquire a document associated with the user characteristic information based on the user characteristic information and the attribute information of the document stored in the storage unit; and a creating unit adapted to create a display content to display pieces of information for identifying the document acquired by the document acquiring unit.

According to another aspect of the present invention, there is provided a document management method comprising the steps of:

acquiring user characteristic information for identifying a user from login information of the user;

acquiring document information of a document;

storing, in a storage unit, the user characteristic information acquired in the user characteristic information acquiring step as attribute information of the document associated with the document information acquired in the document information acquiring step;

acquiring the user characteristic information of the login user in the user characteristic information acquiring step in accordance with login of the user and acquiring a document associated with the user characteristic information based on the user characteristic information and the attribute information of the document stored in the storage unit; and creating a display content to display pieces of information for identifying the document acquired in the document acquiring step.

According to still another aspect of the present invention, there is provided a document management system including a user terminal for performing registration and browsing a document, and a document management apparatus for managing the registered document, the document management apparatus comprises:

a user characteristic information acquiring unit adapted to acquire user characteristic information for identifying a user from login information based on login of the user, the login information being received from the user terminal;

a document information acquiring unit adapted to acquire document information of a document;

a storage unit adapted to store the user characteristic information acquired by the user characteristic information acquiring unit as attribute information of the document associated with the document information acquired by the document information acquiring unit;

a document acquiring unit adapted to acquire, via the user characteristic information acquiring unit, the user characteristic information of the login user in accordance with login of the user and acquire a document associated with the user characteristic information based on the user characteristic information and the attribute information of the document stored in the storage unit; and a creating unit adapted to create a display content to display pieces of information for identifying the document acquired by the document acquiring unit.

According to yet another aspect of the present invention, there is provided a document management method in a document management system including a user terminal for performing registration and browsing a document, and a document management apparatus for managing the registered document, the method comprises the steps of:

acquiring user characteristic information for identifying a user from login information of the user;

acquiring document information of a document;

storing, in a storage unit, the user characteristic information acquired in the user characteristic information acquiring step as attribute information of the document associated with the document information acquired in the document information acquiring step;

acquiring the user characteristic information of the login user in the user characteristic information acquiring step in accordance with login of the user and acquiring a document associated with the user characteristic information based on the user characteristic information and the attribute information of the document stored in the storage unit; and displaying pieces of information for identifying the document acquired in the document acquiring step.

According to the present invention, use of user characteristics makes it possible to cause a user to retrieve and collect information associated with him/her without becoming conscious of a query.

It is also possible to determine the significance of a document based on document attribute weighting, perform a conventionally cumbersome classifying operation such as folder sorting, and present the state of each classification to a user.

Since documents or folders associated with a user are retrieved and collected in accordance with user characteristics, it is possible to reuse already existing useful information associated with the user.

Since user characteristics are defined based on predetermined rules, documents can be collected using keywords according to the user characteristics.

Further features of the present invention will become apparent from the following description of exemplary embodiments with reference to the attached drawings.

BRIEF DESCRIPTION OF THE DRAWINGS

FIG. 2 is a block diagram showing the hardware configuration of a PC in the document management system according to the embodiments;

FIG. 6 is a view showing an example of a user characteristic table in the document management system according to the first embodiment;

DESCRIPTION OF THE EMBODIMENTS

An embodiment of the present invention will now be described with reference to the accompanying drawings.

<Example of Arrangement of Document Management System of Embodiments>

Figure 1:
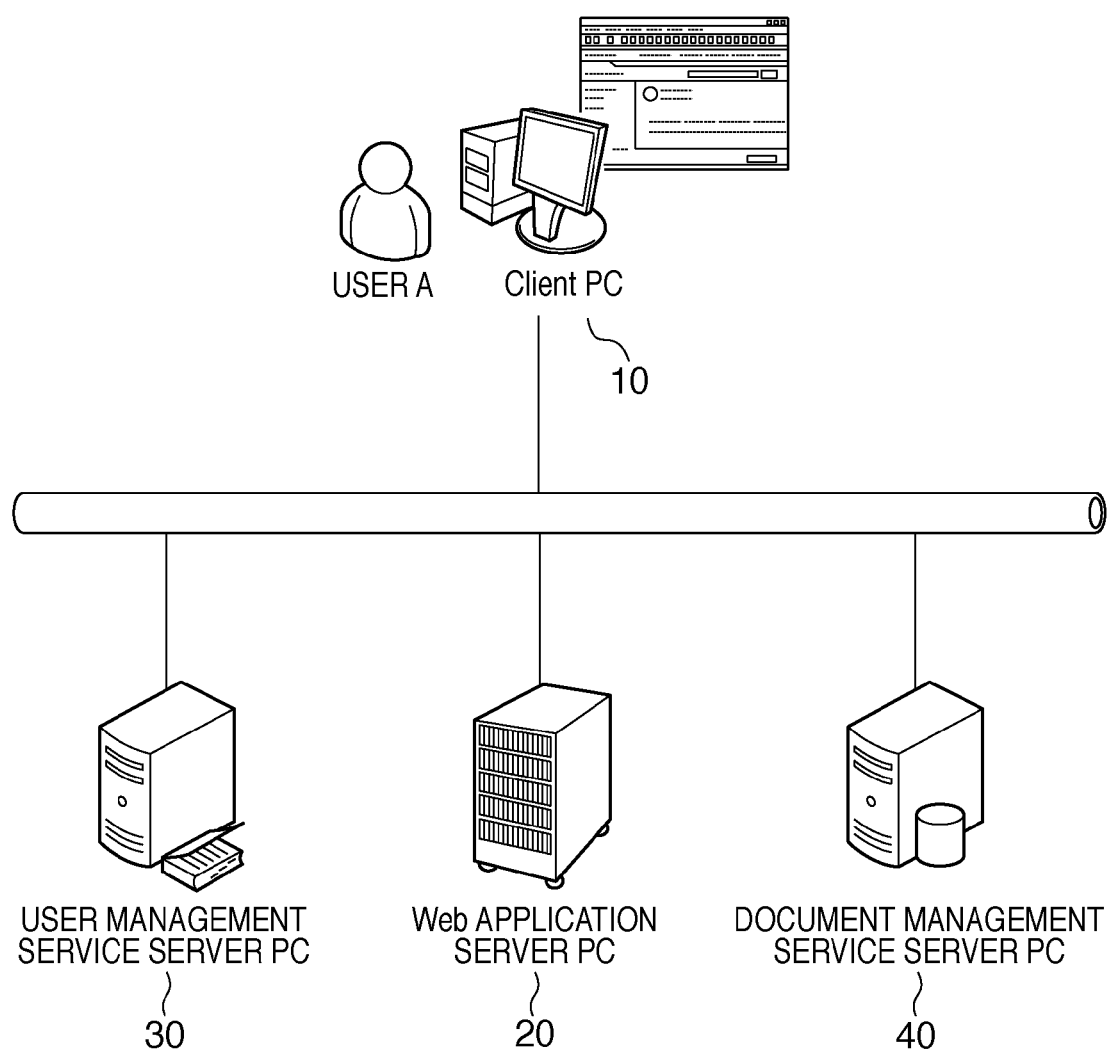
FIG. 1 is a view showing the concept of a document management system according to the embodiments.

FIG. 1 is a view showing the arrangement of a document management system according to the embodiments. In the present invention, a document management application to provide the functions of a document management system to, e.g., a user A is provided as a Web service (Web application).

Referring to FIG. 1, the following devices are connected to the document management system of the embodiment via a network. A Client PC 10 (also referred to as a user terminal) to cause the user A to access the Web application via a Web browser is connected. A Web application server PC 20 which provides the Web application of the document management system of the embodiment is also connected. A user management service server PC 30 which manages the information of a user who accesses the system is also connected. A document management service server PC 40 having a function of storing/managing documents is also connected.

The Web application server PC 20, user management service server PC 30, and document management service server PC 40 are separately arranged. However, these functions may be prepared in one PC. The user A operates the Client PC 10. However, the user may operate one of the three server PCs or a PC that is identical to these server PCs.

The document management system according to the embodiment is designed to make the user A access it via a Web browser. However, a dedicated client application (not shown) may be installed in the Client PC 10 and operated by the user A. In this case, not the Web application server PC 20 but the document management service server PC 40 may communicate with the dedicated client application.

<Example of Hardware Configuration of PC of Embodiments>

FIG. 2 shows an example of the hardware configuration of each PC included in the document management system according to the embodiments. The hardware configuration shown in FIG. 2 is equivalent to that of a general information processing apparatus. The hardware configuration of a general information processing apparatus is applicable to each PC of the embodiment.

Referring to FIG. 2, a CPU 100 executes programs such as an OS and application programs stored in the program ROM of a ROM 102 or loaded from a hard disk 109 to a RAM 101. "OS" is short for an operating system which runs on a computer. The operating system will be referred to as an OS hereinafter. The processes of flowcharts to be described later can be implemented by executing programs under the control of the OS. The RAM 101 functions as the main memory or work area of the CPU 100. A keyboard controller 103 controls key input from a keyboard 107 or a pointing device (not shown). A display controller 104 controls display on various kinds of displays 108. A disk controller 105 controls data access to, e.g., the hard disk (HD) 109 or Floppy® disk (FD) which stores various kinds of data. An NC 106 is connected to a network to execute a communication control process for another device connected to the network.

<Example of Software Configuration of Document Management System of Embodiments>

Figure 3:
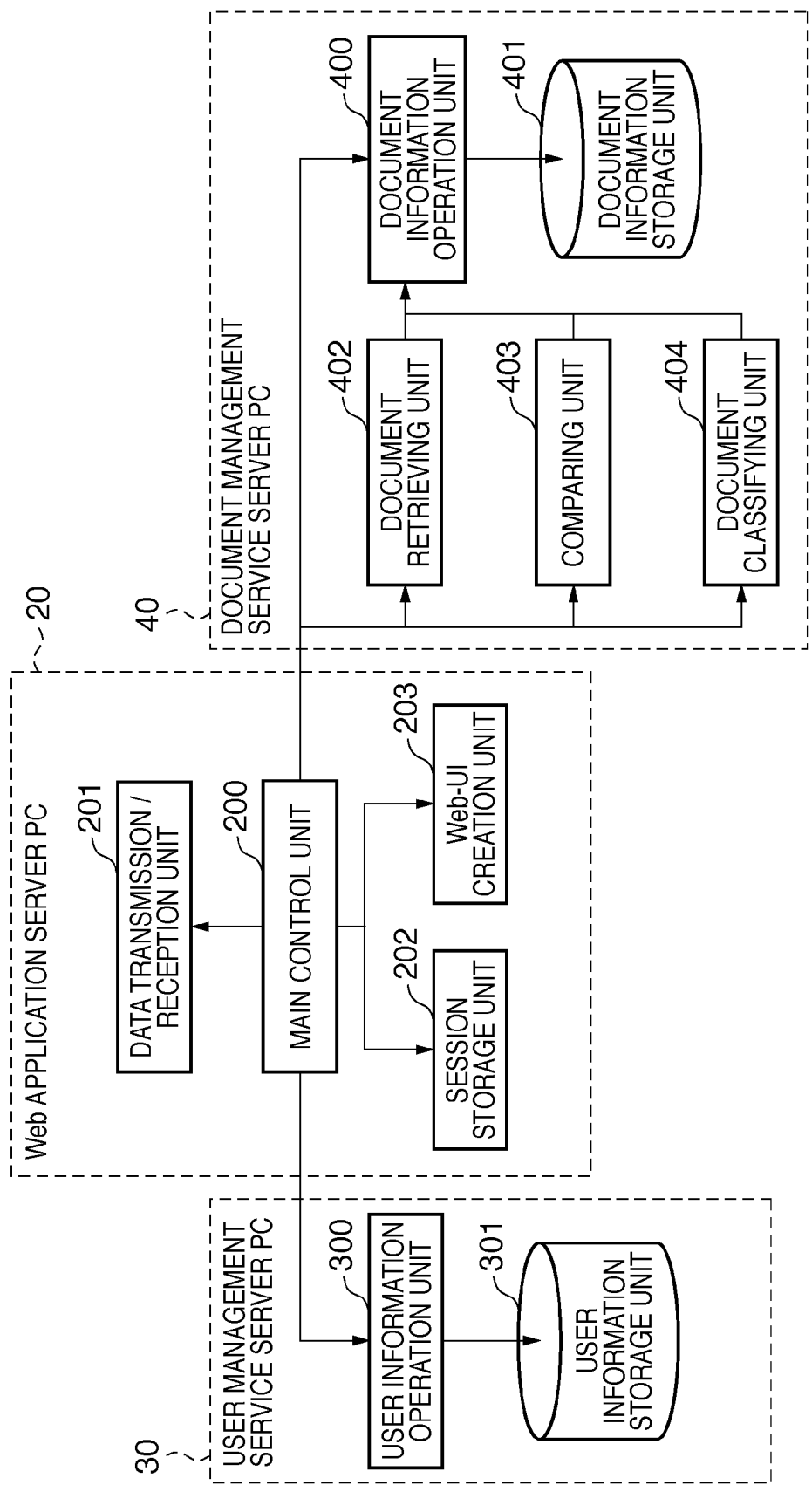
FIG. 3 is a block diagram showing the software configuration of the document management system according to the embodiments.

FIG. 3 is a block diagram showing an example of the software configuration of the document management system according to the embodiments. FIG. 3 shows the software configurations of the Web application server PC 20, user management service server PC 30, and document management service server PC 40.

Referring to FIG. 3, a main control unit 200 in the Web application server PC 20 controls the overall document management system according to the embodiment, thereby sending instructions to the units (to be described later) and managing them. A data transmission/reception unit 201 receives an instruction input by the user via the browser in the Client PC 10, and returns a result from the main control unit 200 to the Client PC 10. When the user accesses the document management system via the browser in the Client PC 10, a session storage unit 202 creates session information representing the access from a single user. The session storage unit 202 holds various kinds of information to be repeatedly used in association with the session information until the user stops accessing the document management system (logout), or the session ends due to, e.g., automatic timeout. A Web-UI creation unit 203 creates a Web-UI (HTML) according to a situation upon receiving an instruction from the main control unit 200. The Web-UI created by the Web-UI creation unit 203 need not always be HTML and may contain a script language such as Java® script.

A user information operation unit 300 in the user management service server PC 30 performs, in accordance with an instruction from the main control unit 200, operations such as extraction and editing of users, who can access the document management system, and user characteristics which are stored in a user information storage unit 301. The user management need not be unique to the document management system. The user information operation unit 300 may cooperate with a known technique such as Active Directory or LDAP, and the user information storage unit 301 may store only user characteristics.

A document information operation unit 400 in the document management service server PC 40 performs, in accordance with an instruction from the main control unit 200, operations such as registration, storing, extraction, and editing of actual documents and document attributes including index information, which are stored in a document information storage unit 401. A document retrieving unit 402 determines a document retrieving method and acquires a retrieval result from the document information storage unit 401 via the document information operation unit 400 in accordance with an instruction from the main control unit 200. A comparing unit 403 compares document attributes with user characteristics in accordance with an instruction from the main control unit 200, and changes the weighting of the attributes of a document stored in the document information storage unit 401 as needed. A document classifying unit 404 executes classification based on the count (weighting) values of document attributes and returns the result to the main control unit 200 in accordance with an instruction from the main control unit 200.

<Example of Process of Document Management System of First Embodiment>

The process in each step of the document management system according to the first embodiment of the present invention will be described below in detail with reference to FIGS. 1 to 13.

(Login and User Characteristics Registration Process)

In this process, the user A accesses (logs in to), via the browser of the Client PC 10, the Web application to provide the functions of the document management system, and in the first login, inputs user characteristics, and stores them in the document management system.

Figure 4:
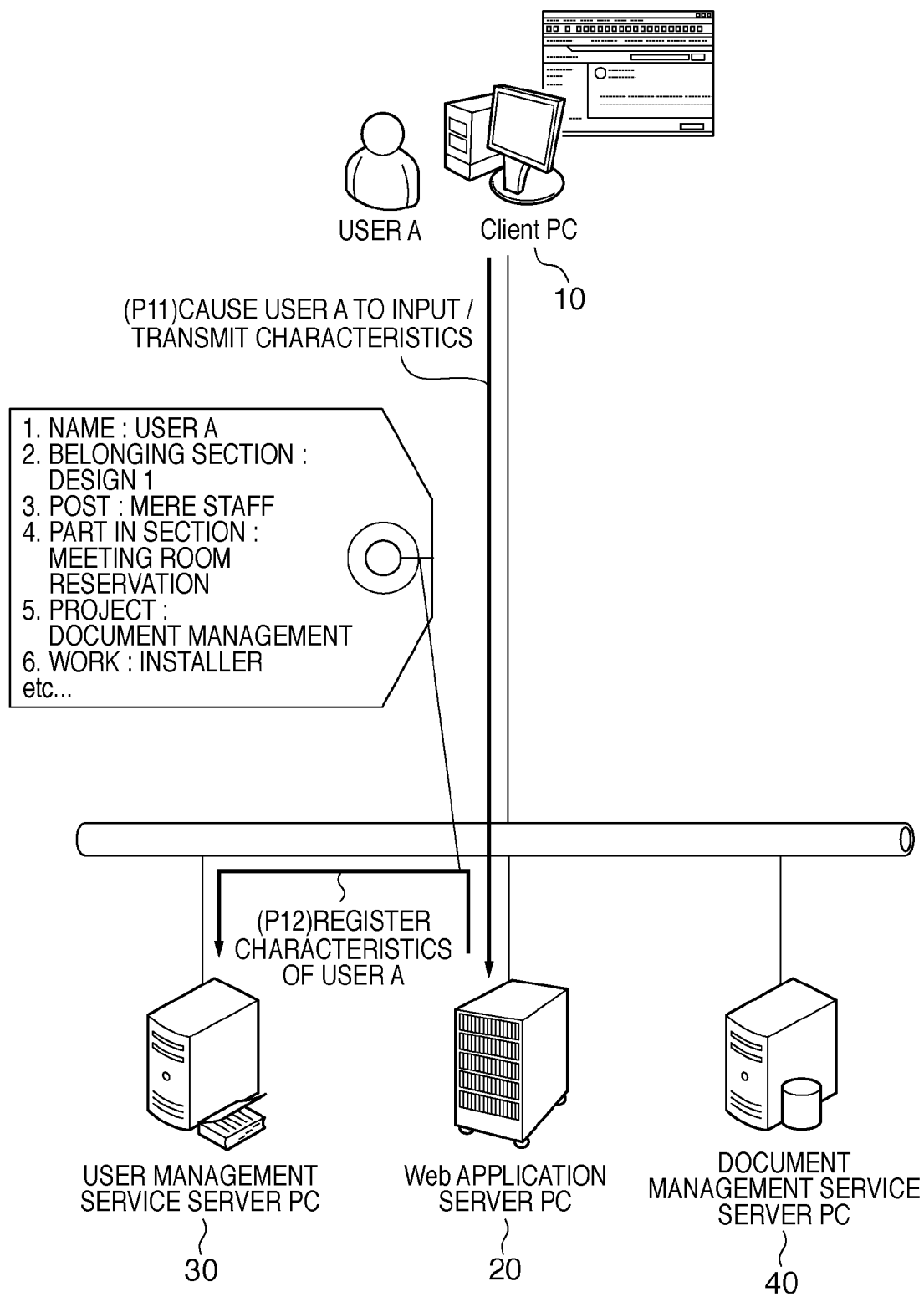
FIG. 4 is a view showing the outline of the login and user characteristics registration process of the document management system according to the first embodiment.
Figure 5:
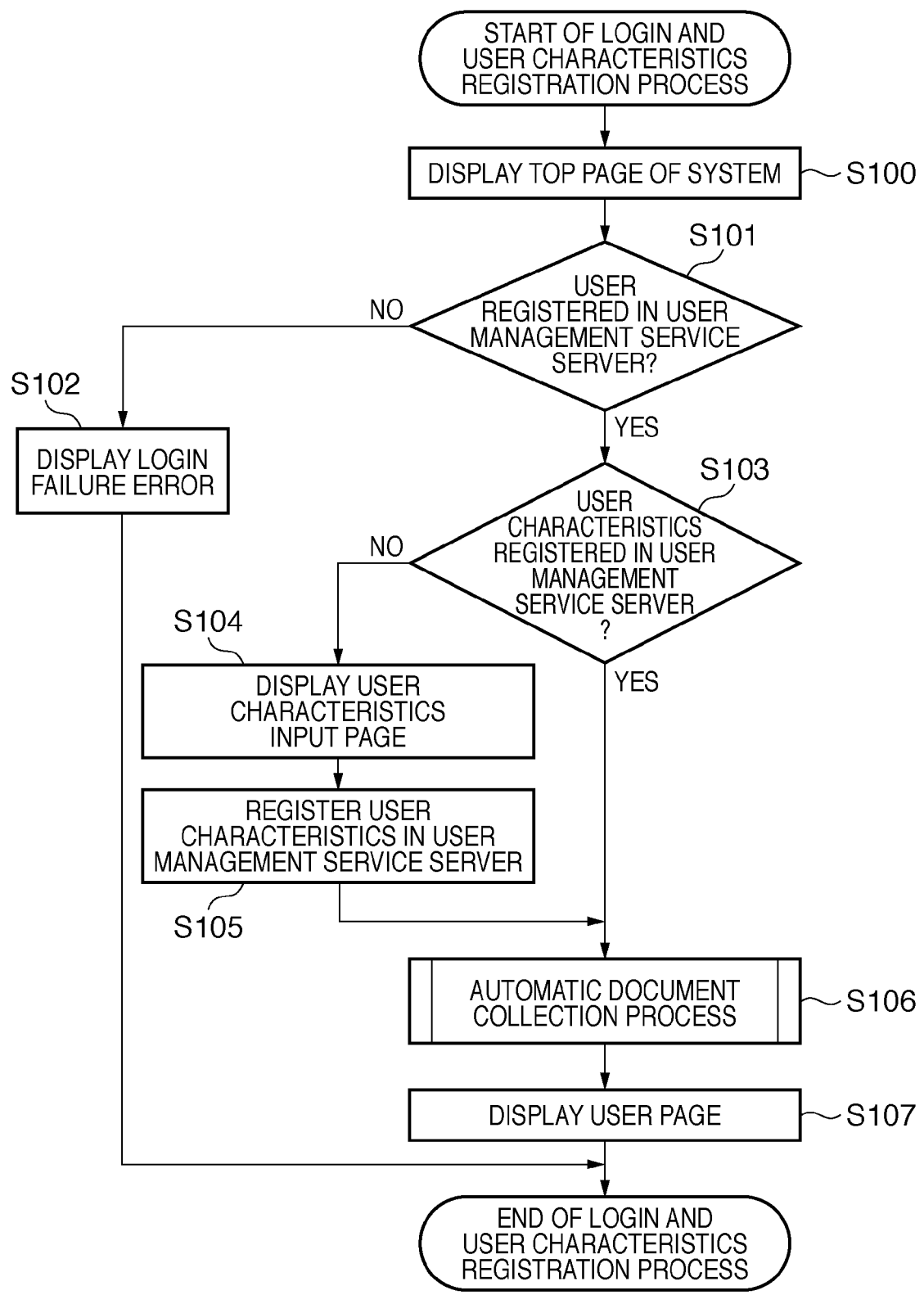
FIG. 5 is a flowchart illustrating the login and user characteristics registration process of the document management system according to the first embodiment.

FIG. 4 shows the outline of the system operation of the login and user characteristics registration process of the document management system. FIG. 5 is a flowchart illustrating an example of the sequence of the login and user characteristics registration process of the document management system. This flowchart represents the process of the main control unit 200 in the Web application server PC 20. FIG. 6 is a view showing user characteristics and an example of a user characteristic table 60 stored in the user information storage unit 301. The login and user characteristics registration process will be described below in detail with reference to FIGS. 4 to 6.

In step S100, the user A accesses, via the browser of the Client PC 10, the top page of the Web application to provide the functions of the document management system. The main control unit 200 receives a request via the data transmission/reception unit 201 and sends it to the Web-UI creation unit 203 to create the top page. The top page of the document management system is returned to the Client PC 10 via the data transmission/reception unit 201 as a response and displayed on the Web browser of the Client PC 10.

In step S101, the user A inputs login information to the top page displayed in step S100. The main control unit 200 receives the login information of the user A via the data transmission/reception unit 201. The main control unit 200 sends an inquiry to the user information operation unit 300 of the user management service server PC 30 and confirms whether the user A who has logged in is a user registered in the user information storage unit 301. If the user A does not exist in the user information storage unit 301, or the password is wrong, the main control unit 200 sends a request to the Web-UI creation unit 203 to create a login failure error page in step S102. The login failure error page is returned to the Client PC 10 via the data transmission/reception unit 201 as a response and displayed on the Web browser of the Client PC 10.

If it is determined in step S101 that the user A has already been registered in the user information storage unit 301, the main control unit 200 causes the session storage unit 202 to create session information in step S103. Then, the main control unit 200 sends an inquiry to the user information operation unit 300 of the user management service server PC 30 and confirms whether the user characteristics of the user A are registered in the user information storage unit 301. The session information creation timing is not limited to here.

If it is determined in step S103 that the user characteristics of the user A have not been registered, the main control unit 200 requests the Web-UI creation unit 203 to create a user characteristics input page in step S104. The user characteristics input page is returned to the Client PC 10 via the data transmission/reception unit 201 as a response and displayed on the Web browser of the Client PC 10. In step S105, the user A inputs the user characteristics to the user characteristics input page displayed in step S104. The main control unit 200 causes the Web application to receive the user characteristics of the user A via the data transmission/reception unit 201 and acquire user characteristic information (process P11 in FIG. 4).

Next, the main control unit 200 instructs the user information operation unit 300 of the user management service server PC 30 to register the user characteristics of the user A in the user information storage unit 301 (process P12 in FIG. 4). At this time, the main control unit 200 also instructs the session storage unit 202 to hold the user characteristics together with the created session information. Since it is unnecessary to acquire the user characteristic information of the user A from the user information storage unit 301 each time, the process speed can increase.

FIG. 6 is a view showing the structure of user characteristics and an example of the user characteristic table 60 stored in the user information storage unit 301.

User characteristics corresponding to each user name 61 include a belonging section 62, post 63, part 64 in section, project 65, work 66 in project, and others 67. The user characteristics are used in an automatic document collection process to be described later.

Note that the user characteristics may include any other information. Each item of the user characteristics may have a plurality of values. For example, it is preferable to allow selection of a plurality of values for a user involved in a plurality of projects. In the user characteristics input page, the user preferably selects the items of user characteristics instead of freely inputting the items. To do this, the administrator or the like at the installation location of the document management system preferably sets appropriate selection items in advance in accordance with the user environment of the installation location.

If it is determined in step S103 that the user characteristics have been registered, or the user characteristics are registered in step S105, an automatic document collection process (to be described later) corresponding to the user characteristics of the user A is executed in step S106. In step S107, the main control unit 200 causes the Web-UI creation unit 203 to create the page of the user A based on the display contents collected and classified in accordance with the user characteristics of the user A in step S106. The page of the user A is returned to the Client PC 10 via the data transmission/reception unit 201 as a response and displayed on the Web browser of the Client PC 10.

Figure 13:
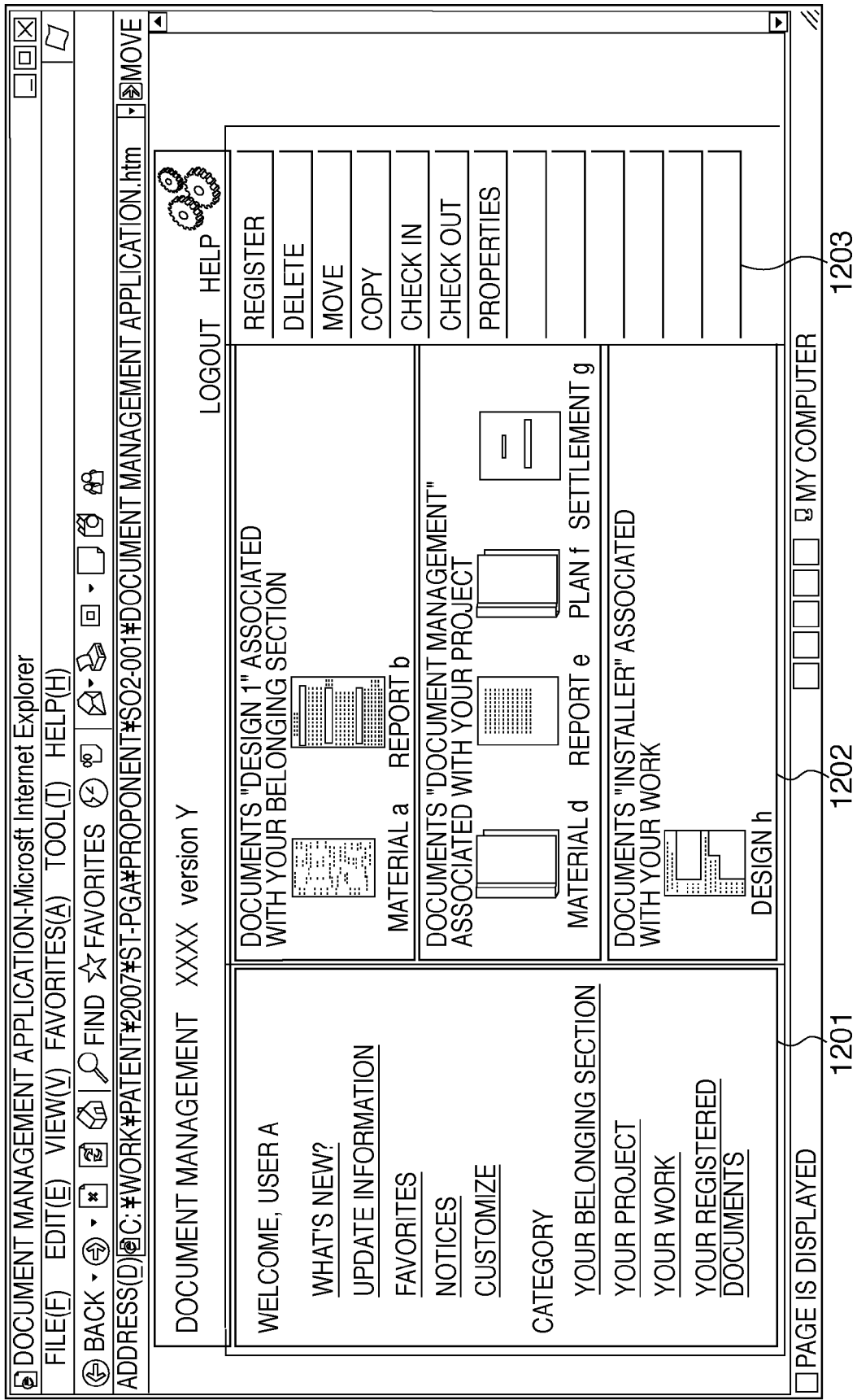
FIG. 13 is a view showing an example of a user interface which displays a document collection result after login to the document management system according to the first embodiment.

FIG. 13 shows an example of the page of the user A displayed on the Client PC 10 in step S107, which includes the display contents collected and classified in accordance with the user characteristics. This will be explained in detail in association with the automatic document collection process.

(Document Registration Process)

In this process, a user accesses (logs in to), via the browser of the Client PC 10, the Web application to provide the functions of the document management system, designates a document, and registers it in the document management system.

Figure 7:
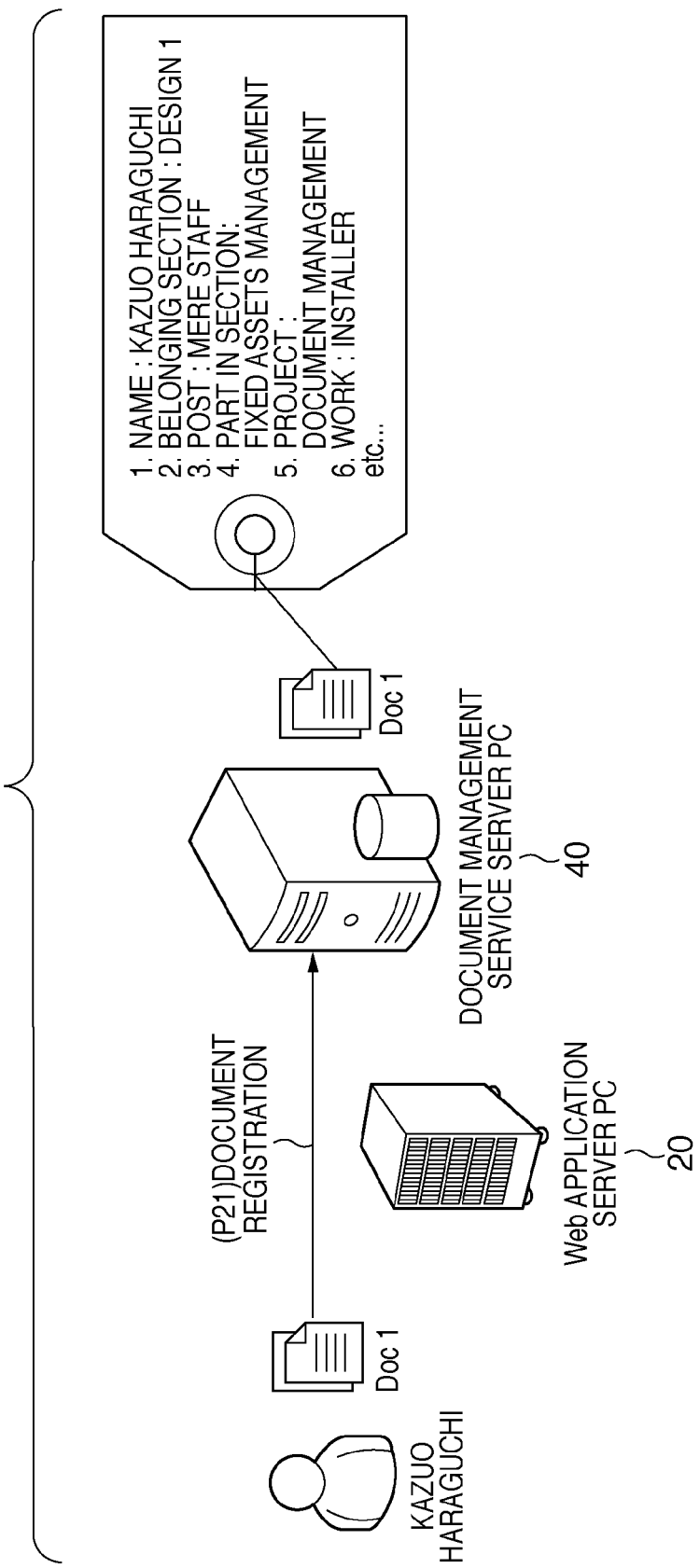
FIG. 7 is a view showing the outline of the document registration process of the document management system according to the first embodiment.
Figure 8:
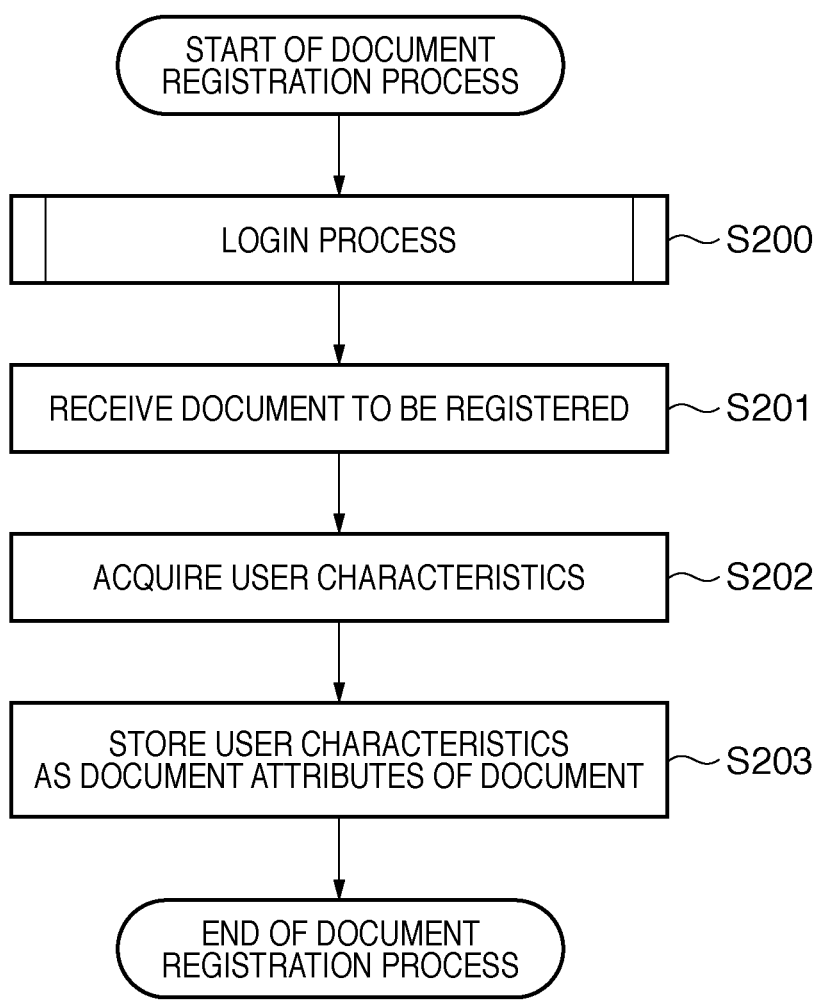
FIG. 8 is a flowchart illustrating the sequence of the document registration process of the document management system according to the first embodiment.

FIG. 7 shows the outline of the system operation of the document registration process of the document management system. FIG. 8 is a flowchart illustrating the sequence of the document process of the document management system. The process will be described below in detail with reference to FIGS. 7 and 8.

Steps S200 to S203 are the processes of the main control unit 200 in the Web application server PC 20.

In step S200, a user (the following description will be made assuming that the user name is "Kazuo Haraguchi") accesses, via the browser of the Client PC 10, the Web application to provide the functions of the document management system. The login process is the same as in the sequence of the login and user characteristics registration process of the document management system described with reference to FIG. 5.

Document registration is executed on the page of, e.g., the user "Kazuo Haraguchi" displayed in step S200. In step S201, the main control unit 200 executes a document information acquiring process to receive a document (the document name is "Doc1") via the data transmission/reception unit 201 as document information. The session storage unit 202 temporarily stores the received document information as a registered document associated with session information.

In step S202, the main control unit 200 acquires the user characteristics of the user "Kazuo Haraguchi" held by the session storage unit 202 in step S200. Note that the main control unit 200 may instruct the user information operation unit 300 to acquire the user characteristics of the user "Kazuo Haraguchi" from the user information storage unit 301.

In step S203, the main control unit 200 instructs the document information operation unit 400 to store, in the document information storage unit 401, the document Doc1 stored in the session storage unit 202 in step S201 (process P21 in FIG. 7). At this time, the user characteristics of the user "Kazuo Haraguchi" acquired by the session storage unit 202 in step S202 are stored as the attribute information of the document "Doc1".

The user who registers the document is automatically classified by the automatic document collection process to be described later. Since it is unnecessary to designate a storage location in the document management system, the user is released from the operation of determining the storage location.

A process of storing a document in the user information storage unit 301 in every document registration has been described. However, the main control unit 200 may update the user characteristics of "Kazuo Haraguchi" held by the session storage unit 202 and store a plurality of documents at once in the user information storage unit 301 at the end of document registration.

(Document Attribute Weighting Process)

A user accesses (logs in to), via the browser of the Client PC 10, the Web application to provide the functions of the document management system, and accesses a document.

The access includes operations such as browsing, printing, and copy. In this embodiment, browsing will be described as an example.

Figure 9:
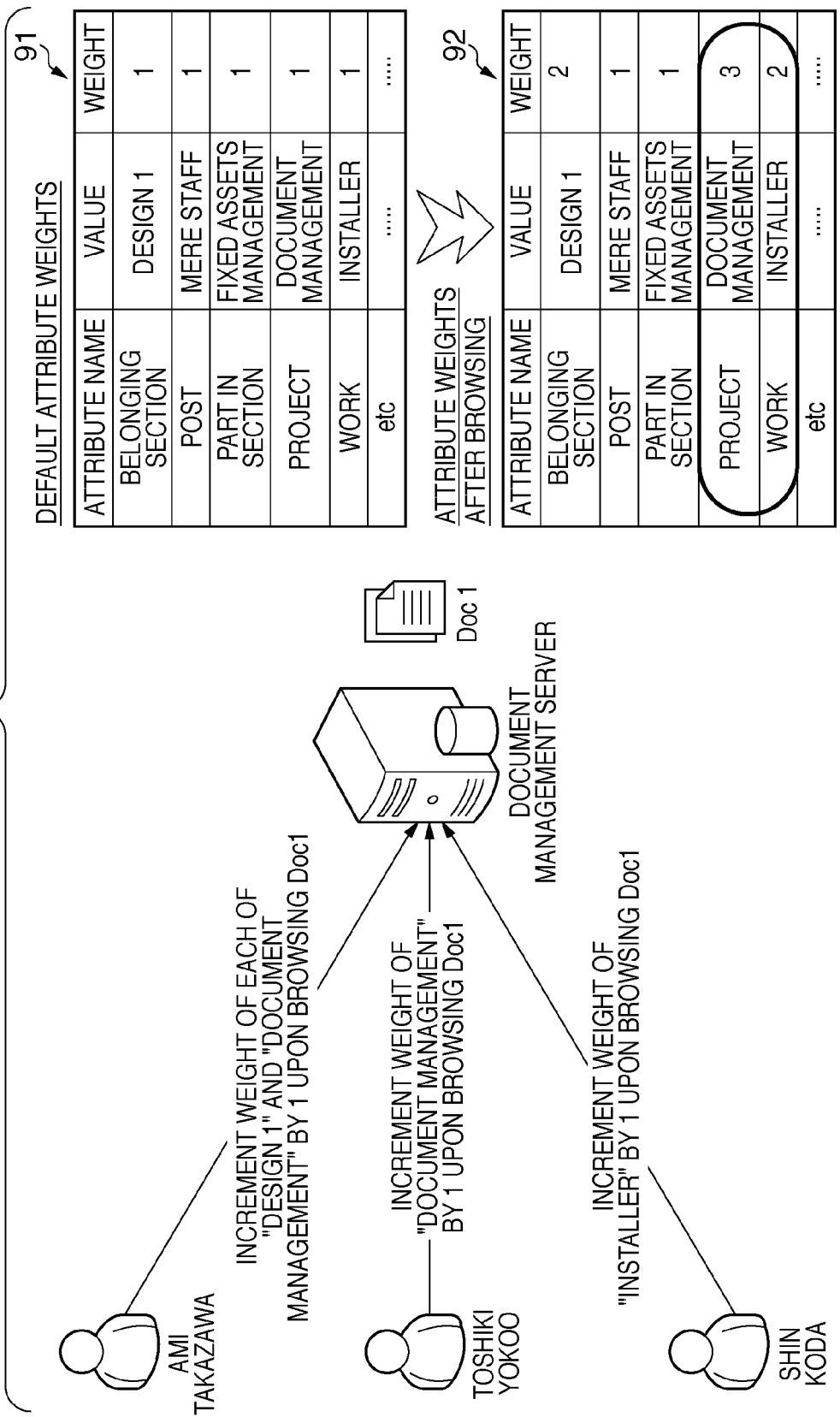
FIG. 9 is a view showing the outline of a weighting process when accessing a document in the document management system according to the first embodiment.
Figure 10:
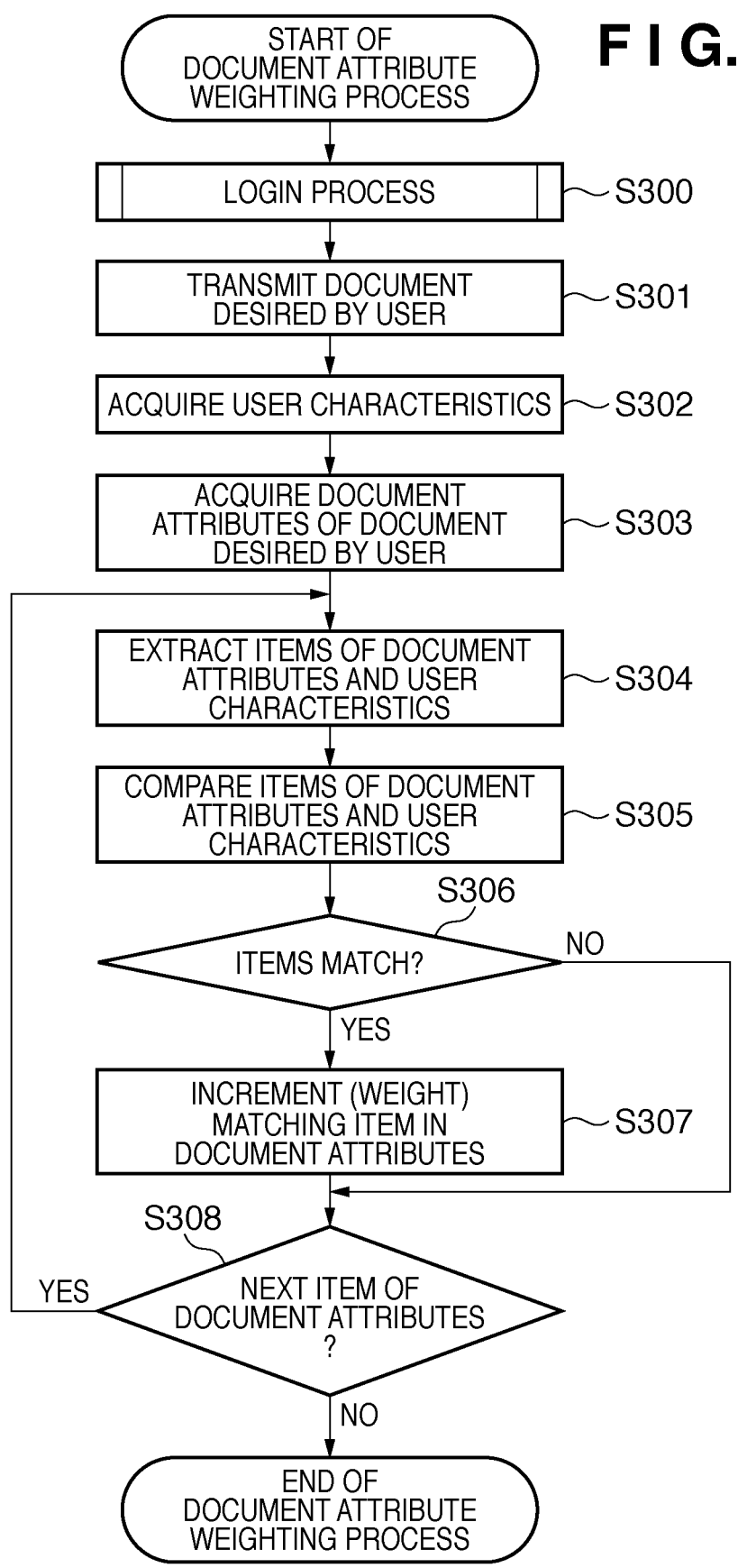
FIG. 10 is a flowchart illustrating the sequence of the weighting process when accessing a document in the document management system according to the first embodiment.

FIG. 9 shows the outline of the system operation of the document attribute weighting process of the document management system. FIG. 10 is a flowchart illustrating an example of the sequence of the document attribute weighting process of the document management system. This flowchart represents the process of the main control unit 200 in the Web application server PC 20.

The process will be described below in detail with reference to FIGS. 9 and 10.

In step S300, a user (the user name is assumed to be "Ami Takazawa") accesses, via the browser of the Client PC 10, the Web application to provide the functions of the document management system. The login process is the same as in the sequence of the login and user characteristics registration process of the document management system described with reference to FIG. 5.

In step S301, the user selects a desired document and executes browsing on the page of the user "Ami Takazawa" displayed in step S300. The main control unit 200 receives the document (the document name is "Doc1" registered by the user "Kazuo Haraguchi" in the above-described registration process) via the data transmission/reception unit 201, and causes the session storage unit 202 to temporarily store the document associated with session information. The information to identify the document designated by the user "Ami Takazawa" for browsing and received via the data transmission/reception unit 201 need not always identify the document name. An ID to identify the document is also usable.

In step S302, the main control unit 200 acquires the user characteristics of the user "Ami Takazawa" held by the session storage unit 202 in step S300. Note that the main control unit 200 may instruct the user information operation unit 300 to acquire the user characteristics of the user "Ami Takazawa" from the user information storage unit 301.

In step S303, the main control unit 200 stores the document attributes of the document Doc1 stored in the session storage unit 202 in step S301. At this time, the main control unit 200 instructs the document information operation unit 400 to acquire the document attributes from the document information storage unit 401 and stores the document attributes in the session storage unit 202 in association with the session information.

In step S304, the main control unit 200 instructs the comparing unit 403 to extract the items of the document attributes and the user characteristics of the user "Ami Takazawa". The document attributes are the document attributes of the document Doc1 acquired and stored in the session storage unit 202 in step S303. The user characteristics are the user characteristics of the user "Ami Takazawa" acquired in step S302. More specifically, in FIG. 9, the value of the first item "belonging section" of the document attributes of the document Doc1 is "design 1". The value of the first item "belonging section" of the user characteristics of the user "Ami Takazawa" is also "design 1". In step S305, the comparing unit 403 compares the item of the document attributes with that of the user characteristics, which are extracted in step S304, to determine whether the items have the same value.

If it is determined in step S306 that the item of the document attributes and that of the user characteristics, which are compared by the comparing unit 403 in step S305, have the same value, the process in step S307 is executed. In step S307, the comparing unit 403 requests the document information operation unit 400 to update the weighting of the document attributes of the document Doc1 stored in the document information storage unit 401. More specifically, the weighting of the item "belonging section" of the document attributes of the document Doc1 is incremented, as shown in FIG. 9. In this embodiment, the weighting of each item of the document attributes stored in the document information storage unit 401 is updated based on the comparison result of the comparing unit 403. However, the comparison results of all items may be reflected at once.

If it is determined in step S306 that the item of the document attributes and that of the user characteristics have different values, it is confirmed in step S308 whether the next item of the document attributes exists. More specifically, "post" exists as the second item of the document attributes of the document Doc1. Hence, the process from step S304 is continued.

The processes in steps S304 to S308 are repeated. When the last item of the document attributes of the document Doc1 is extracted, and comparison with all items of the user characteristics is ended, the document attribute weighting process ends.

FIG. 9 shows a document attribute weighting 91 immediately after registration of the document Doc1 and the change result of a document attribute weighting 92 of the document Doc1 after the users "Ami Takazawa", "Toshiki Yokoo", and "Shin Koda" have browsed the document Doc1. Consequently, the weight value of "project" of the document attributes is larger than the weight value of "belonging section". That is, the document Doc1 has a higher relevance to "document management" as a project than to "design 1" as a belonging section. At the time of classification of the automatic document collection process to be described later, it is possible to automatically determine that the relevance to "project" or "document management" as a project is high.

In this way, any one of attributes added to a document, which is supposed to have a higher relevance to the document itself, is weighted in every document access such as document browsing by a user who uses the document management system. This allows automatic collection (retrieval) of documents associated with a user.

(Automatic Document Collection Process of First Embodiment)

Figure 11:
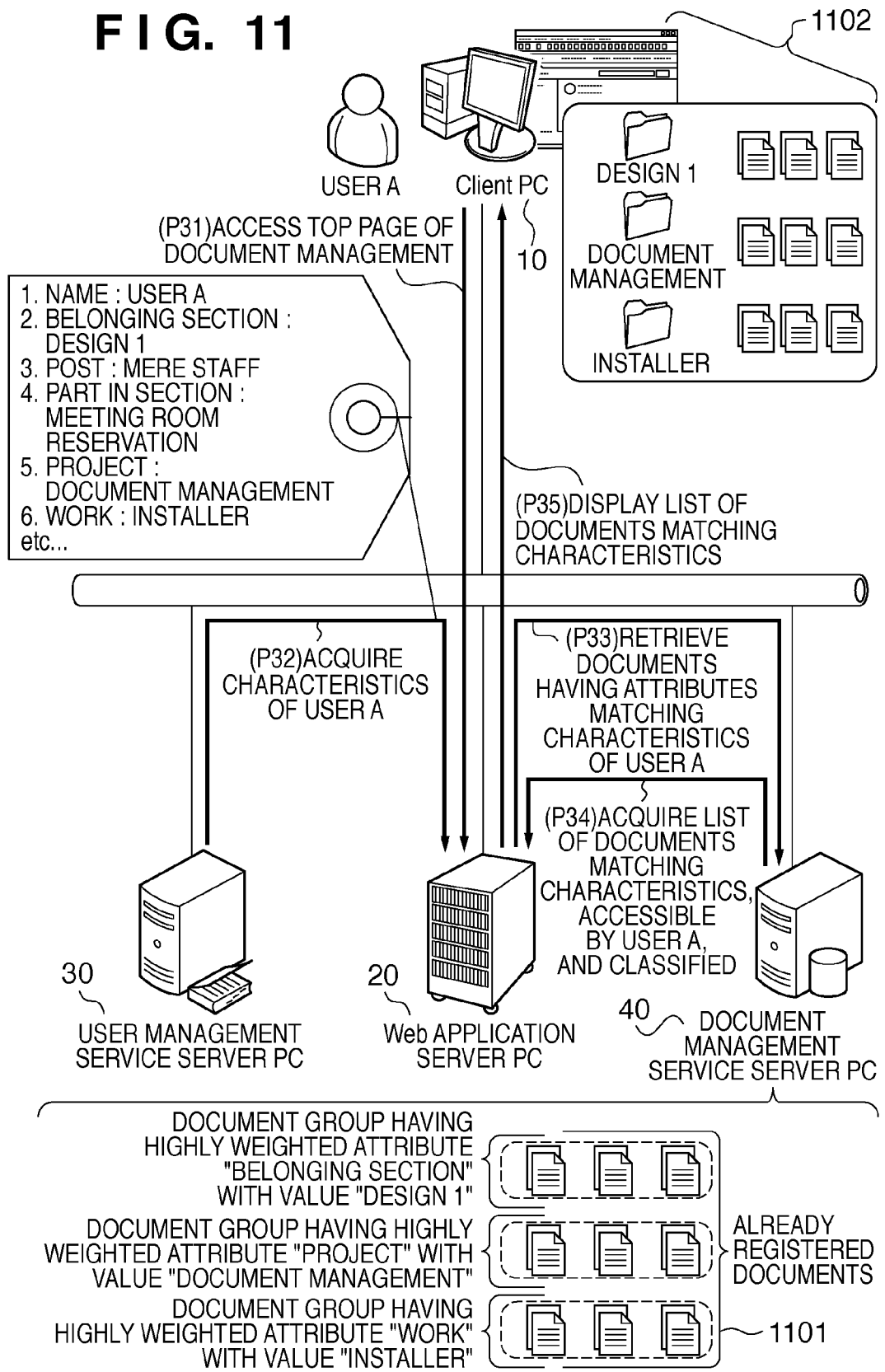
FIG. 11 is a view showing the outline of a document collection process upon login to the document management system according to the first embodiment.
Figure 12:
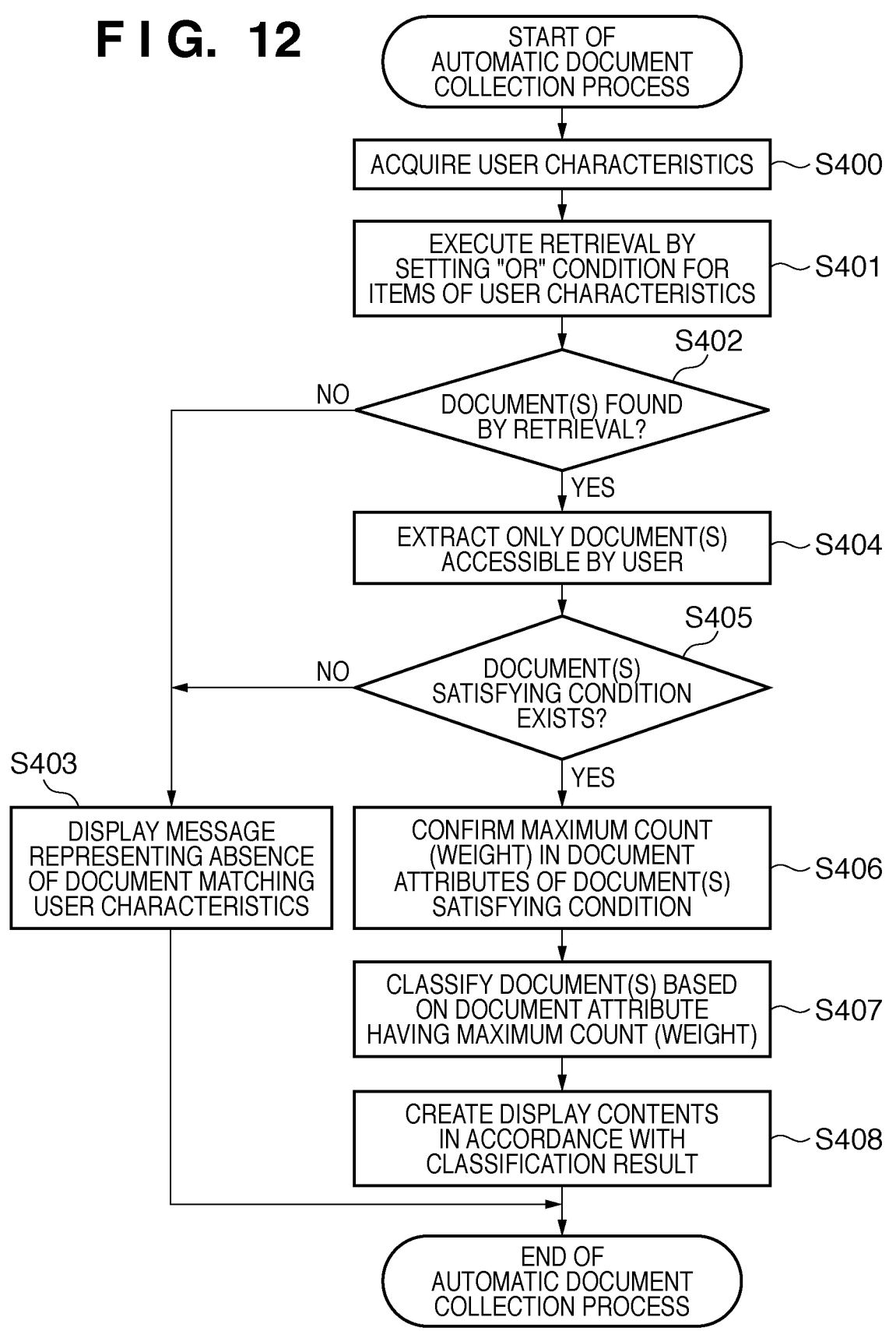
FIG. 12 is a flowchart illustrating the sequence of the document collection process upon login to the document management system according to the first embodiment.

The user A accesses (logs in to), via the browser of the Client PC 10, the Web application to provide the functions of the document management system (process P31 in FIG. 11). The document collection process automatically runs, and a list of acquired documents is displayed on the browser of the Client PC 10. FIG. 11 shows the outline of the system operation of the automatic document collection process of the document management system. FIG. 12 is a flowchart illustrating the sequence of the automatic document collection process of the document management system. This flowchart represents the process of the main control unit 200 in the Web application server PC 20. The process will be described below in detail with reference to FIGS. 11 and 12. The flowchart of the automatic document collection process in FIG. 12 shows steps after the user A has logged in to the document management system.

In step S400, the main control unit 200 acquires the user characteristics of the user A held by the session storage unit 202. Note that the main control unit 200 may instruct the user information operation unit 300 to acquire the user characteristics of the user A from the user information storage unit 301 as indicated by a process P32 in FIG. 11.

In step S401, the main control unit 200 instructs the document retrieving unit 402 to execute document retrieval based on the user characteristics acquired in step S400 (process P33 in FIG. 11). Setting an OR condition for keywords which are the values of the items of the user characteristics, the document retrieving unit 402 instructs the document information operation unit 400 to retrieve, from the document information storage unit 401, a document which is already registered by a registrant and matches the condition. More specifically, for the user A ("Kazuo Haraguchi"), the retrieval is performed using "design 1", "document management", and "installer" of the user characteristics as keywords.

If it is determined in step S402 that the document retrieving unit 402 found no document satisfying the condition in step S401, step S403 is executed. In step S403, the main control unit 200 requests the Web-UI creation unit 203 to create an error page to notify the user that no document that matches the user characteristics was found. The error page is returned to the Client PC 10 via the data transmission/reception unit 201 as a response and displayed on the Web browser of the Client PC 10.

If it is determined in step S402 that the document retrieving unit 402 found one or more documents satisfying the condition, the main control unit 200 executes a document acquiring process in step S404 to acquire the document list of the retrieval result. Next, the main control unit 200 extracts, in the document list of the retrieval result, only documents accessible by the user A from the document information storage unit 401 via the document information operation unit 400.

If it is determined in step S405 that no document accessible by the user A was extracted in step S404, step S403 is executed. In step S403, the main control unit 200 requests the Web-UI creation unit 203 to create an error page to notify the user that no document accessible by the user was found. The error page is returned to the Client PC 10 via the data transmission/reception unit 201 as a response and displayed on the Web browser of the Client PC 10.

If it is determined in step S405 that one or more documents was found as a result of the retrieval of document based on the user characteristics and the extraction of documents accessible by the user A, the process advances to step S406. In step S406, the main control unit 200 instructs the document classifying unit 404 to confirm an item having the maximum count (weight) in the document attributes of each document of the retrieved and extracted documents.

In step S407, the document classifying unit 404 classifies the confirmed document based on the item having the maximum count (weight) in the document attributes and creates a list including the classified documents. More specifically, if "belonging section" has the maximum count (weight) in the document attributes of a document, the document is classified into the belonging section "design 1".

In step S408, the main control unit 200 receives the list of documents 1101 in FIG. 11 classified by the document classifying unit 404 in step S407 (process P34 in FIG. 11). Next, the main control unit 200 requests the Web-UI creation unit 203 to create the display contents of a page which displays the list of documents automatically collected and classified in accordance with the user characteristics (display 1102 in FIG. 11). The page is returned to the Client PC 10 via the data transmission/reception unit 201 as a response and displayed on the Web browser of the Client PC 10 as a page after login of each user (process P35 and display 1102 in FIG. 11).

(Example of Document Collection Result Display Screen of First Embodiment)

FIG. 13 shows an example of a user interface (UI) which displays a document collection result according to the embodiment after login to the Web application to provide the functions of the document management system.

In a document display area 1202, the document collection result classified in accordance with the characteristics of the user A is displayed. More specifically, lists of automatically collected and classified documents are displayed in the areas of the belonging section "design 1", the project "document management" in charge of the user, and the work "installer" in the project in charge of the user.

In FIG. 13, newly-arrived documents are displayed, or the UI is customized. A user area 1201 to select a folder link highly relevant to the user and an area 1203 to operate or control the documents are also displayed.

The form, configuration, and control of the Web-UI (HTML) serving as a user interface are not limited to those of the example shown in FIG. 13. Any other configuration is usable if HTML to implement necessary functions is created.

<Example of Process of Document Management System of Second Embodiment>

An example of a process according to the second embodiment of the present invention will be described. In the process example of the second embodiment, it is possible to change the document attribute weighting to classify documents registered in the document management system as desired by a user, in addition to the process of the document management system according to the first embodiment. The arrangement of the document management system, and processes such as user and document registration, weighting, and automatic collection are the same as in the first embodiment, and a description thereof will not be repeated.

(Document Attribute Weighting Change Process)

Figure 14:
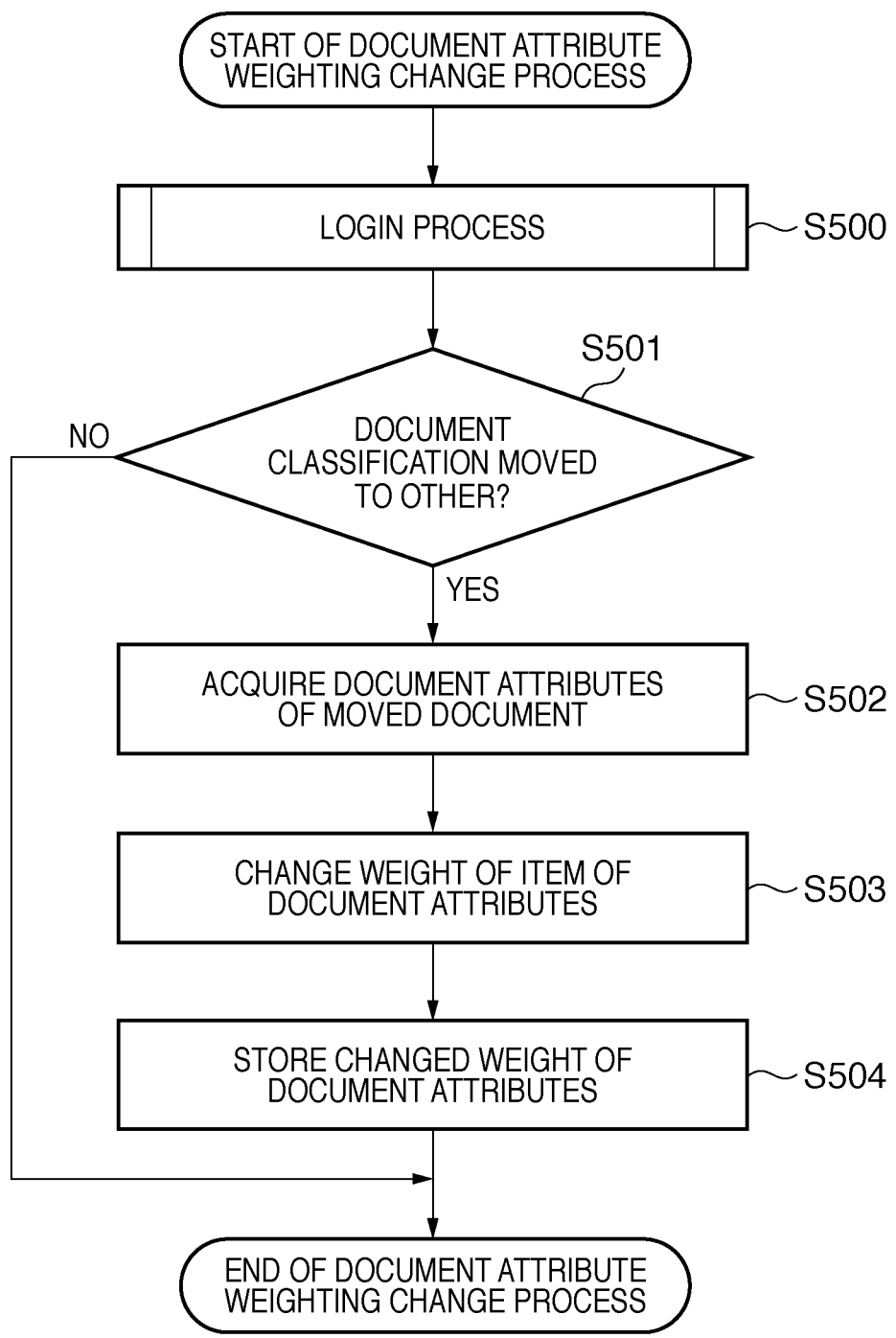
FIG. 14 is a flowchart illustrating the sequence of the document attribute weighting change process of a document management system according to the second embodiment.

FIG. 14 is a flowchart illustrating the sequence of the document attribute weighting change process of the document management system according to the second embodiment. This flowchart represents the process of a main control unit 200 in a Web application server PC 20. A user accesses (logs in to), via the browser of a Client PC 10, a Web application to provide the functions of the document management system, designates a specific document, and manually changes the classification of the automatically classified document. The process will be described below in detail with reference to FIG. 14.

In step S500, a user logs in to, via the browser of the Client PC 10, the Web application to provide the functions of the document management system. The login process is the same as in the sequence of the login and user characteristics registration process of the document management system described with reference to FIG. 5.

In step S501, the main control unit 200 confirms whether the user has designated a desired document on the user page displayed in step S500 and executed a move of the designated document to other classification. If no move of the designated document is confirmed, the process ends.

If the move of the designated document is confirmed, the main control unit 200 stores, in a session storage unit 202, the document designated by the user and received via a data transmission/reception unit 201 and the information of the classification of the moving destination temporarily in association with session information. The information to identify the document designated by the user and received via the data transmission/reception unit 201 and the classification of the moving destination need not always identify the names. IDs to identify the pieces of information are also usable.

In step S502, the main control unit 200 instructs a document information operation unit 400 to acquire, from a document information storage unit 401, the document attributes of the document designated by the user, moved to other classification and stored in the session storage unit 202 in step S501. The main control unit 200 stores the document attributes of the document in the session storage unit 202 in association with the session information.

In step S503, the main control unit 200 changes the document attribute weighting of the document information of the document designated by the user, which is stored in the session storage unit 202 in step S502, to classify the document as desired and designated by the user, and stores the changed document attribute weighting. More specifically, the weight value of an item of the document attributes corresponding to the classification is incremented to a value larger than the weight value of any other item of the document attributes so that the document is classified as desired and designated by the user.

In step S504, the main control unit 200 requests the document information operation unit 400 to update the document attribute weighting of the document stored in the document information storage unit 401, using the weight value of the document attributes changed in step S503, and store the document attribute weighting.

Instead of changing the document attribute weighting of the document stored in the document information storage unit 401, the document attribute value of the designated document may be stored as the customized/personalized information of the user. In this case, the main control unit 200 instructs a user information operation unit 300 to hold the document attribute information and information representing the designated document in a user information storage unit 301 in association with user information. This enables to automatically classify the document as desired by the user in the next user's login to the document management system.

The information representing the document and the document attribute information are stored in the user information storage unit 301. Information representing the result of document classification desired by the user may be stored in place of the document attribute information.

In this embodiment, the operation of causing the user to change the document classification has been described. However, the user operation is not limited to this. For example, when the user has deleted a document on the login window, the weighting may be changed to inhibit the document from being displayed on the login window of the user from next time. This process can be implemented by, e.g., adding attribute information to hide the deletion-instructed document. The document itself which is set to be hidden by this method is not deleted actually. It is therefore possible to acquire the document by an intentional retrieval for the database storing all documents.

Since the process of the second embodiment allows the user to change the document classification, more appropriate classification can be done.

<Example of Process of Document Management System of Third Embodiment>

An example of a process according to the third embodiment of the present invention will be described. A document management system of the third embodiment is different from that of the first embodiment in the automatic document collection process. In the third embodiment, a document list is hierarchically displayed on the browser of a Client PC 10 as a result of the automatic document collection process. The arrangement of the document management system, and processes such as user and document registration, weighting, and weighting change are the same as in the first and second embodiments, and a description thereof will not be repeated.

(Automatic Document Collection Process of Third Embodiment)

Figure 15:
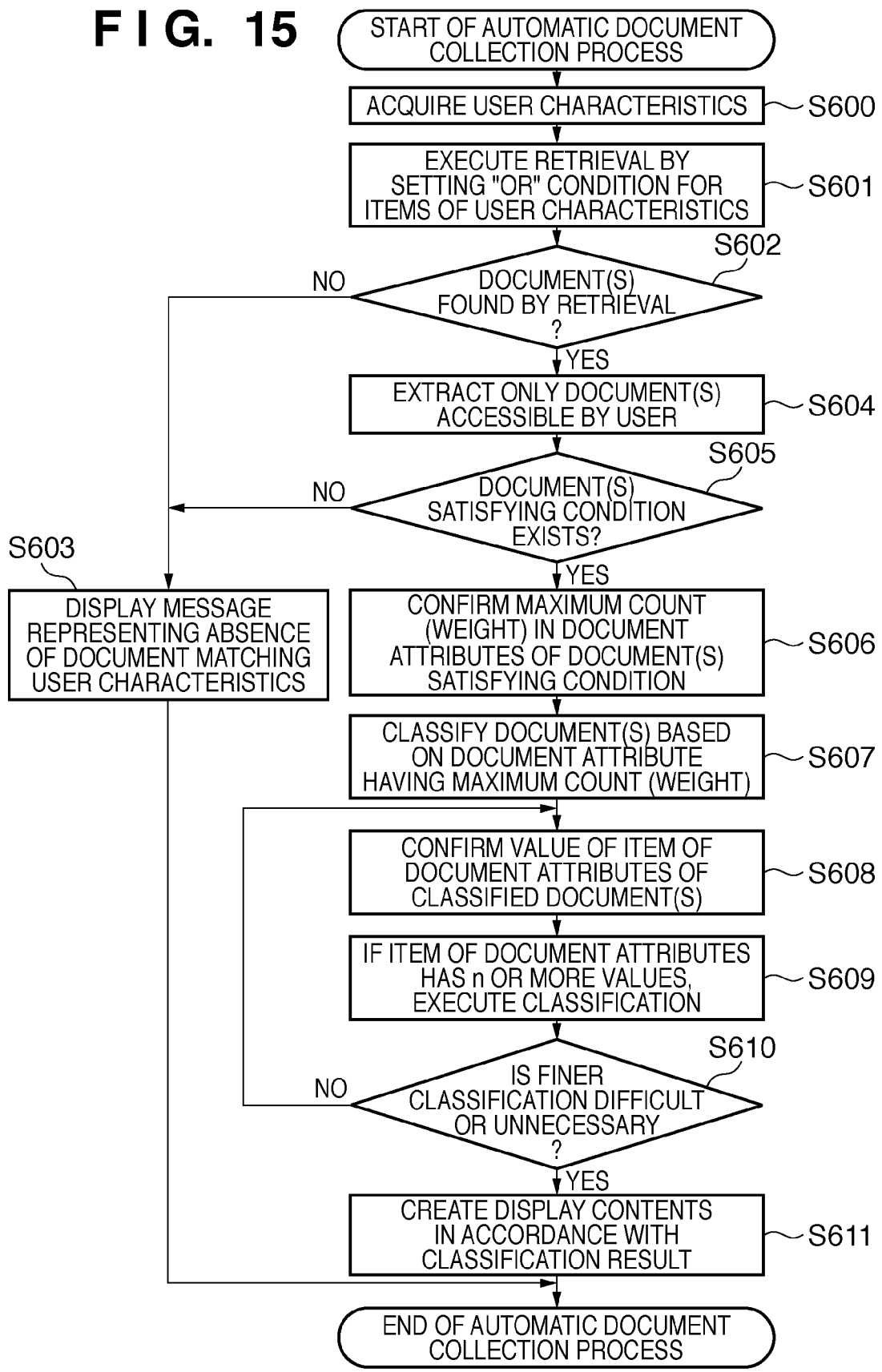
FIG. 15 is a flowchart illustrating the sequence of a document collection process upon login to a document management system according to the third embodiment.
Figure 16:
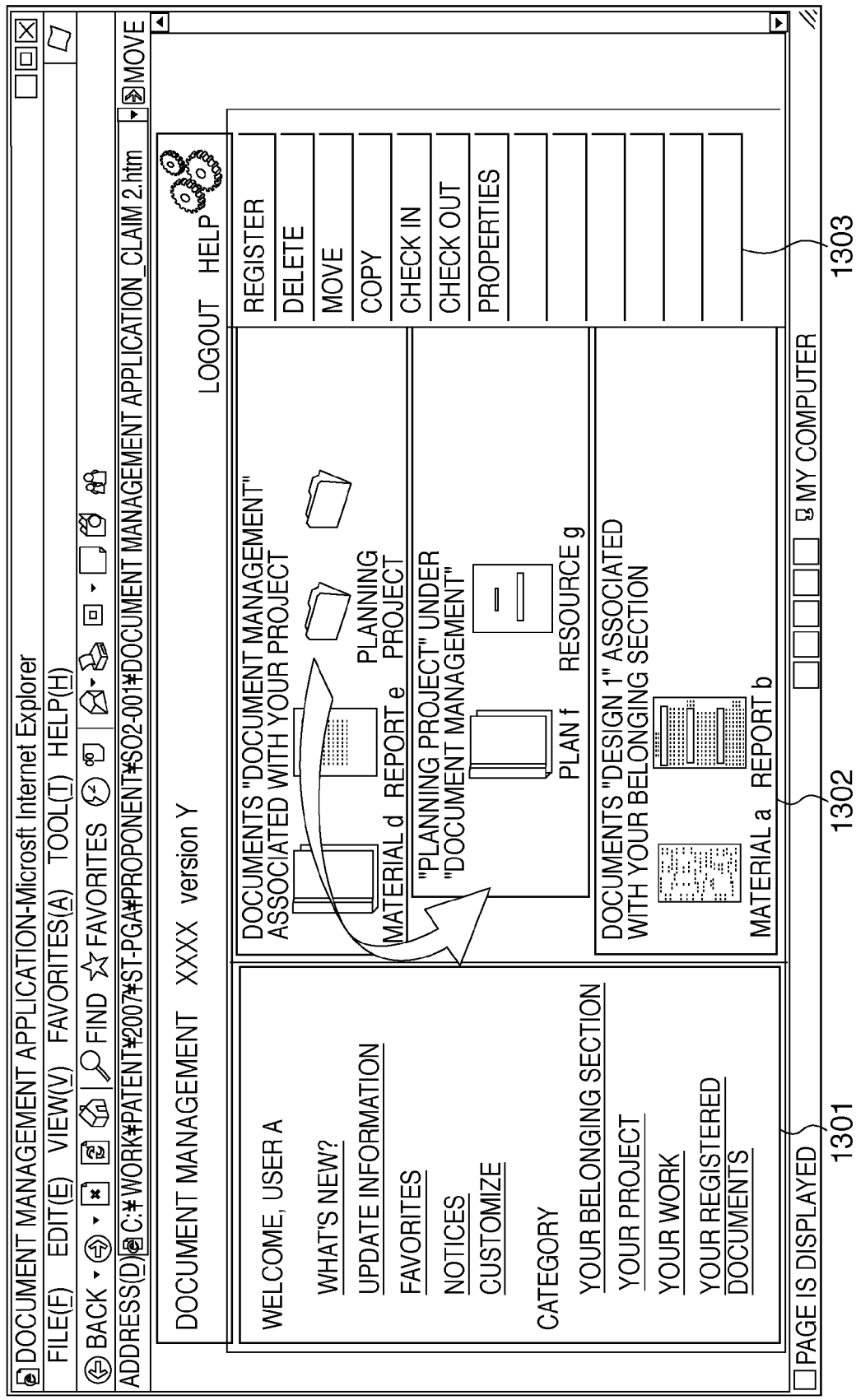
FIG. 16 is a view showing an example of a user interface which displays a document collection result after login to the document management system according to the third embodiment.

FIG. 15 is a flowchart illustrating the sequence of the automatic document collection process of the document management system according to the third embodiment. This flowchart represents the process of a main control unit 200 in a Web application server PC 20. The characteristic features of FIG. 15 are the processes in steps S608 to S610. FIG. 16 shows an example of a user interface which displays a document collection result in the document management system according to the third embodiment.

In the third embodiment, when a user A accesses (logs in to), via the browser of the Client PC 10, a Web application to provide the functions of the document management system, the document collection process automatically runs. A document list acquired on the Web browser of the Client PC 10 is hierarchically displayed. The process will be described below in detail with reference to FIGS. 15 and 16. The flowchart of the automatic document collection process in FIG. 15 shows steps after the user A has logged in to the document management system.

In step S600, the main control unit 200 acquires the user characteristics of the user A held by a session storage unit 202. Note that the main control unit 200 may instruct a user information operation unit 300 to acquire the user characteristics of the user A from a user information storage unit 301.

In step S601, the main control unit 200 instructs a document retrieving unit 402 to execute document retrieval based on the user characteristics acquired in step S600. Setting an OR condition for keywords which are the values of the items of the user characteristics, the document retrieving unit 402 instructs a document information operation unit 400 to retrieve, from a document information storage unit 401, a document that matches the condition. More specifically, for the user A, the retrieval is performed using "design 1", "document management", and "installer" of the user characteristics as keywords.

In step S602, the main control unit 200 determines whether or not the document retrieving unit 402 found one or more documents satisfying the condition in step S601. If no document was found, the main control unit 200 requests a Web-UI creation unit 203 in step S603 to create an error page to notify the user that no document that matches the user characteristics was found. The main control unit 200 returns the error message to the Client PC 10 via a data transmission/reception unit 201 as a response so that the error page is displayed on the Web browser of the Client PC 10.

If it is determined in step S602 that the document retrieving unit 402 found one or more documents satisfying the condition, the main control unit 200 acquires the document list of the retrieval result in step S604. Next, the main control unit 200 extracts, in the document list of the retrieval result, only documents accessible by the user A from the document information storage unit 401 via the document information operation unit 400.

In step S605, the main control unit 200 determines whether or not a document accessible by the user A was extracted in step S604. If no document accessible by the user A was extracted, the main control unit 200 requests the Web-UI creation unit 203 in step S603 to create an error page to notify the user that no document accessible by the user was found. The main control unit 200 returns the error message to the Client PC 10 via the data transmission/reception unit 201 as a response so that the error page is displayed on the Web browser of the Client PC 10.

If one or more documents accessible by the user A was found as a result of the retrieval of documents based on the user characteristics and the extraction of documents accessible by the user A, the process advances to step S606. In step S606, the main control unit 200 instructs a document classifying unit 404 to confirm an item having the maximum count (weight) in the document attributes of each document of the retrieved and extracted document. When the item having the maximum count (weight) in the document attributes of each document of the retrieved and extracted document is confirmed in step S606, the main control unit 200 classifies the retrieved and extracted documents based on the item having the maximum count (weight) and creates a list of the classified documents in step S607. More specifically, if "document management" has the maximum count (weight) in the document attributes of a document, the document is classified into the project "document management" in charge.

In step S608, the main control unit 200 instructs the document classifying unit 404 to confirm the value of each item of the document attributes in the list of documents classified in step S607. When the value of each item of the document attributes of each document in the document list is confirmed in step S608, and an item of the document attributes has n or more values, the main control unit 200 newly classifies the item in step S609.

More specifically, assume that "document management" has the maximum count (weight) in the document attributes of a document, and the item "work" of the document attributes has n or more values "planning project". In this case, the document is classified into "planning project" under the project "document management" in charge (FIG. 16).

Note that n can be either a value designable by the user via a user interface (not shown) or a value fixed in the document management system.

Instead of simply confirming the value of each item of the document attributes in step S608, items of the document attributes, which are associated with the item having the maximum count (weight) in the document attributes, are extracted in step S607, and then, the value of each item of the document attributes may be confirmed. More specifically, if "document management" has the maximum count (weight) in the document attributes of a document, it may be confirmed for only the item "work" of the document attributes whether the item of the document attributes has n or more values. This allows the user to do more significant hierarchical classification.

In step S610, the main control unit 200 determines whether it is difficult or unnecessary to cause the document classifying unit 404 to do finer classification for the list of documents classified in step S609. More specifically, it is confirmed for the document list whether the same item of the document attributes as that used for determination of classification in step S609 has n or more values. If the condition is not satisfied, the classifying process is stopped, and the process advances to step S611 to be described later.

In step S611, the main control unit 200 receives the list of documents classified by the document classifying unit 404 in steps S607 and S609. Next, the main control unit 200 requests the Web-UI creation unit 203 to create a page which hierarchically displays the list of documents automatically collected and classified in accordance with the user characteristics. The page is returned to the Client PC 10 via the data transmission/reception unit 201 as a response and displayed on the Web browser of the Client PC 10 as a page after login of each user.

(Example of Document Collection Result Display Screen of Third Embodiment)

FIG. 16 shows an example of a user interface which displays a document collection result according to the third embodiment after login to the Web application to provide the functions of the document management system.

In a document display area 1302, the document collection result classified in accordance with the characteristics of the user A is displayed. More specifically, lists of automatically collected and classified documents are displayed in the classified areas of the belonging section "design 1", the project "document management" in charge of the user, and the work "installer" in the project in charge of the user. If the documents classified into "document management" are further classified, for example, a "planning project" folder is displayed. When the user selects the folder, the list of documents classified into "planning project" is displayed. In FIG. 16, newly-arrived documents are displayed, or the UI is customized. A user area 1301 to select a folder link highly relevant to the user and an area 1303 to operate or control the documents are also displayed.

The form, configuration, and control of the Web-UI (HTML) serving as a user interface are not limited to those of the example shown in FIG. 16. Any other configuration is usable if HTML to implement necessary functions is created.

According to the third embodiment, the classification result can be presented as a more detailed hierarchical structure. This makes it possible to access a desired document in a more finely classified state.

Note that the system arrangement of this embodiment allows to execute the same process independently of whether the system is connected to a LAN or connected via an external wired/wireless network.

The objects of the present invention are also achieved by supplying a storage medium (or recording medium) which records software program codes to implement the functions of the above-described embodiments to a system or apparatus and causing the computer (or CPU or MPU) of the system or apparatus to read out and execute the program codes stored in the storage medium.

In this case, the program codes themselves read out from the storage medium implement the functions of the above-described embodiments. The storage medium that stores the program codes constitutes the present invention.

The functions of the above-described embodiments are implemented not only by causing the computer to execute the readout program codes. The present invention also incorporates a case in which the operating system (OS) running on the computer partially or wholly executes actual processing based on the instructions of the program codes, thereby implementing the functions of the above-described embodiments.

The present invention also incorporates a case in which the program codes read out from the storage medium are written in the memory of a function expansion card inserted to the computer or a function expansion unit connected to the computer, and the CPU of the function expansion card or function expansion unit partially or wholly executes actual processing based on the instructions of the program codes, thereby implementing the functions of the above-described embodiments.

The storage medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-026902, filed Feb. 6, 2008, which is hereby incorporated by reference herein in its entirety.

What is claimed is:

1. A document management apparatus for managing a plurality of documents registered in a storage device, the apparatus comprising:

at least one processor coupled to a memory, the processor being programmed to control one or more of:

a user characteristic information acquiring unit configured to acquire user characteristic information including items for identifying a user based on login information of the user when the user logs in;

a storage unit configured to store the user characteristic information of the user as attribute information of a document together with the document in the storage device when the user registers the document in the storage device, and store weights representing a relevance between the document and each of the items of the user characteristic information of the user as attribute information of the document;

a document acquiring unit configured to acquire a document from the plurality of documents stored in the storage device, wherein the acquired document has at least one item of user characteristic information of a first user who logs in; and a creating unit configured to create a display content to display information according to the user characteristic information of the first user together with an identification for identifying the document acquired by the document acquiring unit, wherein the creating unit classifies the identification based on the weight of each of the items stored by the storage unit, wherein, when the first user instructs to print the document by using the identification, the weight corresponding to the at least one item stored in the storage device is updated, and wherein, when the first user instructs to delete the document by using the identification, the weights corresponding to the items of the user characteristic information of the first user are changed, the identification for identifying the document instructed to be deleted disappears, the document remains in the storage device, and the identification is not displayed based on the changed weights the next time the first user logs in.

2. The apparatus according to claim 1, further comprising a change unit configured to compare the user characteristic information with the attribute information of the document and, if the attribute information of the document includes an item of the user characteristic information, change weight of that item.

3. The apparatus according to claim 1, wherein the creating unit hierarchically classifies, based on the weight of each of the items stored by said storage unit, the identification into multiple contents and displays the classified information.

4. A document management method for managing a plurality of documents registered in a storage device, the method comprising:

acquiring user characteristic information including items for identifying a user, based on login information of the user when the user logs in;

storing the user characteristic information of the user as attribute information of a document together with the document in the storage device when the user registers the document in the storage device, and storing weights representing a relevance between the document and each of the items of the user characteristic information of the user as attribute information of the document;

acquiring a document from the plurality of documents stored in the storage device, wherein the document has at least one item of user characteristic information of a first user who logs in; and creating a display content to display information according to the user characteristic information of the first user together with an identification for identifying the document, wherein creating the display content includes classifying the identification based on the weight of each of the items stored, wherein, when the first user instructs to print the document by using the identification, the weight corresponding to the at least one item stored in the storage device is updated, and wherein, when the first user instructs to delete the document by using the identification, the weights corresponding to the items of the user characteristic information of the first user are changed, the identification for identifying the document instructed to be deleted disappears, the document remains in the storage device, and the identification is not displayed based on the changed weights the next time the first user logs in.

5. The method according to claim 4, further comprising comparing the user characteristic information with the attribute information of the document and, if the attribute information of the document includes an item of the user characteristic information, changing the weight of that item.

6. The method according to claim 4, wherein creating the display content includes hierarchically classifying the identification into multiple contents based on the weight of each of the stored items and displaying the classified information.

7. A computer-readable storage medium storing a computer-executable program which causes a computer to execute steps of a document management method according to claim 4.

8. A document management system including a user terminal for performing registration and browsing a document, and a document management apparatus for managing a plurality of documents registered in a storage device, the document management apparatus comprising:

at least one processor coupled to a memory, the processor being programmed to control one or more of:

a user characteristic information acquiring unit configured to acquire user characteristic information including items for identifying a user based on login information of the user when the user logs in;

a storage unit configured to store the user characteristic information of the user as attribute information of a document together with the document in the storage device when the user registers the document in the storage device, and store weights representing a relevance between the document and each of the items of the user characteristic information of the user as attribute information of the document;

a document acquiring unit configured to acquire a document from the plurality of documents stored in the storage device, wherein the acquired document has at least one item of user characteristic information of a first user who logs in; and a creating unit configured to create a display content to display information according to the user characteristic information of the first user together with an identification for identifying the document, wherein the creating unit classifies the identification based on the weight of each of the items stored by the storage unit, wherein, when the first user instructs to print the document by using the identification, the weight corresponding to the at least one item stored in the storage device is updated, and wherein, when the first user instructs to delete the document by using the identification, the weights corresponding to the items of the user characteristic information of the first user are changed, the identification for identifying the document instructed to be deleted disappears, the document remains in the storage device, and the identification is not displayed based on the changed weights the next time the first user logs in.

9. The system according to claim 8, wherein the user terminal and the document management apparatus communicate with each other via a network, the user terminal causes the user to log in to, via a Web browser, a document management application for performing registration and browsing a document, and displays, on the Web browser, the display content created by the creating unit.

10. A document management method for managing a plurality of documents registered in a storage device in a document management system including a user terminal for performing registration and browsing a document, and a document management apparatus for managing the registered document, the method comprising:

acquiring user characteristic information including items for identifying a user, based on login information of the user when the user logs in;

storing the user characteristic information of the user as attribute information of a document together with the document in the storage device when the user registers the document in the storage device, and storing weights representing a relevance between the document and each of the items of the user characteristic information of the user as attribute information of the document;

acquiring a document from the plurality of documents stored in the storage device, wherein the acquired document has at least one item of user characteristic information of a first user who logs in; and creating a display content to display information according to the user characteristic information of the first user together with an identification for identifying the document, wherein creating the display content includes classifying the identification based on the weight of each of the items stored, wherein, when the first user instructs to print the document by using the identification, the weight corresponding to the at least one item stored in the storage device is updated, and wherein, when the first user instructs to delete the document by using the identification, the weights corresponding to the items of the user characteristic information of the first user are changed, the identification for identifying the document instructed to be deleted disappears, the document remains in the storage device, and the identification is not displayed based on the changed weights the next time the first user logs in.

* * * * *